(12) United States Patent
Nelson

(10) Patent No.: US 6,178,733 B1
(45) Date of Patent: Jan. 30, 2001

(54) EXTERNAL BLOWER MOTOR AND STARTING MOTOR FOR A COMBUSTION TURBINE SYSTEM

(75) Inventor: Robert John Nelson, Lake Mary, FL (US)

(73) Assignee: Siemens Westinghouse Power Corporation, Orlando, FL (US)

( * ) Notice: Under 35 U.S.C. 154(b), the term of this patent shall be extended for 0 days.

(21) Appl. No.: 09/131,842

(22) Filed: May 29, 1998

(51) Int. Cl.$^7$ .................................. F02C 7/26; F02C 7/12
(52) U.S. Cl. .................... 60/39.02; 60/39.141; 60/39.83; 290/2
(58) Field of Search ................ 60/39.02, 39.141, 60/39.142, 39.33, 39.83; 290/2, 52

(56) References Cited

U.S. PATENT DOCUMENTS

| | | | |
|---|---|---|---|
| 3,418,485 | * 12/1968 | Anderson et al. | 290/52 |
| 3,791,682 | * 2/1974 | Mitchell | 290/2 |
| 3,816,751 | * 6/1974 | Jampen et al. | 290/2 |
| 4,243,526 | * 1/1981 | Ransmark | 203/10 |
| 4,904,890 | * 2/1990 | Archibald et al. | 310/59 |
| 5,172,543 | * 12/1992 | White | 60/39.02 |

FOREIGN PATENT DOCUMENTS 56-32041 * 4/1981 (JP) ..................... 60/39.83

* cited by examiner

*Primary Examiner*—Ted Kim
(74) *Attorney, Agent, or Firm*—Eckert Seamans Cherin & Mellott, LLC

(57) ABSTRACT

A combustion turbine system of this invention includes a compressor, a combustor, a turbine section, an external blower, an electrical generator and a prime mover for powering the blower and the compressor. The compressor produces a compressed air that mixes with fuel in the combustor to produce a hot gas. This hot gas is sent through the turbine section of the combustion turbine system to drive a rotor. The electrical generator may be coupled to the rotor, so that rotation of the rotor causes operation of the electrical generator. The rotor may also be coupled to the compressor, so that the rotation of the rotor also drives the compressor. The blower of this invention is external to the generator and provides a cooling medium for the electrical generator.

The prime mover is coupled to the external blower so that it can power the blower and provide the cooling medium for the electrical generator. In addition, the prime mover is selectively connectable to the rotor, so that it can turn the rotor. In a preferred embodiment of this invention, the prime mover is an electrical motor. The prime mover can turn the rotor when the combustion turbine is not producing sufficient hot gas to turn the rotor, for example when the combustion turbine is being started. After the combustion turbine has been started and provides a sufficient amount of hot gas to drive the compressor, the prime mover for the rotor is no longer needed and can be disconnected from the rotor and the turbine section can act as the prime mover for the rotor.

19 Claims, 1 Drawing Sheet

EXTERNAL BLOWER MOTOR AND STARTING MOTOR FOR A COMBUSTION TURBINE SYSTEM

BACKGROUND OF THE INVENTION

This invention relates to combustion turbine systems and prime movers for combustion turbine systems that can be used to power a blower that produces air for cooling an electrical generator and to selectively power a compressor of the combustion turbine system. This invention also relates to methods of using these prime movers and combustion turbine systems that employ them.

Combustion turbine systems generally include a compressor, a combustor and a turbine section. The compressor compresses air, and the air is directed to the combustor. In the combustor, the air is mixed with fuel, and this mixture is burned to produce a hot gas. The hot gas is sent through the turbine section of the combustion turbine system where a portion of the energy in the hot gas is converted into useful work. This work may include rotation of a rotor which drives a load, such as an electrical generator. After traveling through the turbine section, the hot gas is exhausted from the combustion turbine.

Typically, the compressor and the electrical generator are both mounted on the rotor that extends through the turbine section of the combustion turbine system.

Therefore, as the hot gas flows through the turbine section and causes the rotor to rotate, the compressor and the electrical generator are both driven by the rotation of the rotor. Thus, when the rotor shaft is driven in the turbine section by the expansion of the hot gas, electricity can be produced by the electrical generator.

Because electrical generators produce a significant amount of heat, they must be cooled. A heat exchanger may be disposed within the electrical generator in order to provide the requisite cooling. The heat exchanger may be employed in a cooling circuit that includes a blower for supplying air as the cooling medium to the heat exchanger and a cooler for cooling the air after it has been heated while traveling through the heat exchanger.

In prior art combustion turbine systems, the blower that provides cooling for the electrical generator may be mounted on a shaft of the electrical generator, so that rotation if the rotor shaft by the hot gas produced in the turbine section of the combustion turbine system will cause rotation of the blower. In other words, the combustion turbine acts as the prime mover for the blower.

In order to start a gas turbine, the compressor must be started so that is can provide the air at the requisite pressure for mixing with fuel to produce a hot gas to drive the rotor. As alluded to above, during normal operations of a combustion turbine system the compressor is powered by the hot gas that expands and drives the rotor in the turbine section. Since the mixture of fuel and compressed air needed to drive the turbine rotor and the compressor is not available upon starting the combustion turbine, a prime mover must be provided in order to start the compressor. Typically, the prime mover is an electrical induction motor. After the combustion turbine has been started and sufficient hot gas is produced, the compressor is powered by the rotation of the rotor and the prime mover that powers the compressor is no longer required.

In prior art combustion turbine systems, the prime mover for powering the blower motor for the cooling circuit of the electrical generator and the prime mover for starting the compressor were separate components. The prime mover for starting the compressor was used to merely start the compressor, and the prime mover for the blower was the combustion turbine.

This invention relates to improved combustion turbine systems that employ prime movers that can be used to selectively power a compressor upon starting a combustion turbine and be used to power a blower for producing a cooling medium for an electrical generator. This invention also relates to these prime movers themselves, and improved methods of using these combustion turbine systems employing the prime movers.

SUMMARY OF THE INVENTION

A combustion turbine system of this invention includes a rotor, a compressor, a combustor, a turbine section, a blower, an electrical generator and an external prime mover for powering the blower and turning the rotor. The compressor produces a compressed air that mixes with fuel in the combustor to produce a hot gas. This hot gas is sent through the turbine section of the combustion turbine system to drive the rotor. The electrical generator may be coupled to the rotor, so that rotation of the rotor causes operation of the electrical generator. The rotor may also be coupled to the compressor, so that the rotation of the rotor also drives the compressor. The blower provides a cooling medium for the electrical generator.

The prime mover is coupled to the blower so that it can power the blower and provide the cooling medium for the electrical generator. In addition, the prime mover is selectively connectable to the rotor, so that it can turn the rotor. In a preferred embodiment of this invention, the prime mover is an electrical motor. The prime mover can turn the rotor when the combustion turbine is not producing sufficient hot gas to drive the rotor, for example when the combustion turbine is being started. After the combustion turbine has been started and provides a sufficient amount of hot gas to turn the rotor, the prime mover for the rotor is no longer needed and can be disconnected from the rotor and the turbine section can act as the prime mover for the rotor.

In order to selectively couple the prime mover to the rotor, the combustion turbine system may have a clutch or torque converter disposed between the prime mover and the compressor. Upon starting the combustion turbine system, the clutch or torque converter can be operated to couple the prime mover to the rotor and thereby provide power to the rotor. After the combustor produces sufficient hot gas to drive the rotor and the compressor, the clutch can be operated to decouple the prime mover from the compressor. The blower may be disposed between the prime mover and the clutch, so that the prime mover powers the blower irrespective of the position of the clutch.

The blower may be disposed in either a closed cooling circuit for the electrical generator or an open cooling system. If employed in a closed cooling system, the system may include a heat exchanger. The head exchanger may be disposed in the electrical generator to cool the cooling medium. After being pressurized by the blower, the cooling medium can flow through the generator and absorb heat produced by the generator. The cooling medium may then be cooled by the heat exchanger and then recirculated by the blower through the cooling circuit.

If the blower is employed in an open loop cooling system, the blower sends ambient air through the generator to cool the generator. The air is not recirculated in this type of system, but rather is exhausted to atmosphere.

Since the blower is powered by the prime mover, the blower is not powered by the turbine as in a conventional system. The conventional shaft mounted blowers are less efficient than the external blower of this invention. Therefore, this invention may increase the efficiency of the turbine system.

The external blower of this invention can also be used with a steam turbine system. As is conventional, a steam turbine system may have a condenser, a turbine, a steam generator and an electrical generator. The electrical generator may be coupled to the steam turbine so that the steam turbine is the prime mover for the electrical generator. Similar to the electrical generator used in a gas turbine system, the electrical generator of the steam turbine system also requires cooling. According to this invention, an external blower that is external to the electrical generator may be used to supply a cooling medium to the generator. The blower is external in that it is not contained within the generator enclosure that encases the electrical generator.

Similar to the electrical generator of the gas turbine system, the electrical generator of the steam turbine system may have either an open or a closed loop cooling system. The external blower of this invention may be mounted on the rotor shaft that connects the steam turbine to the electrical generator. If the electrical generator is mounted on the rotor shaft, the electrical generator is separated from the electrical generator by either a clutch or a torque converter. Alternatively, the external blower is not mounted on the rotor shaft and is separated from the electrical generator.

Other features of the invention are described below.

DETAILED DESCRIPTION OF THE PREFERRED EMBODIMENTS

Figure 1:
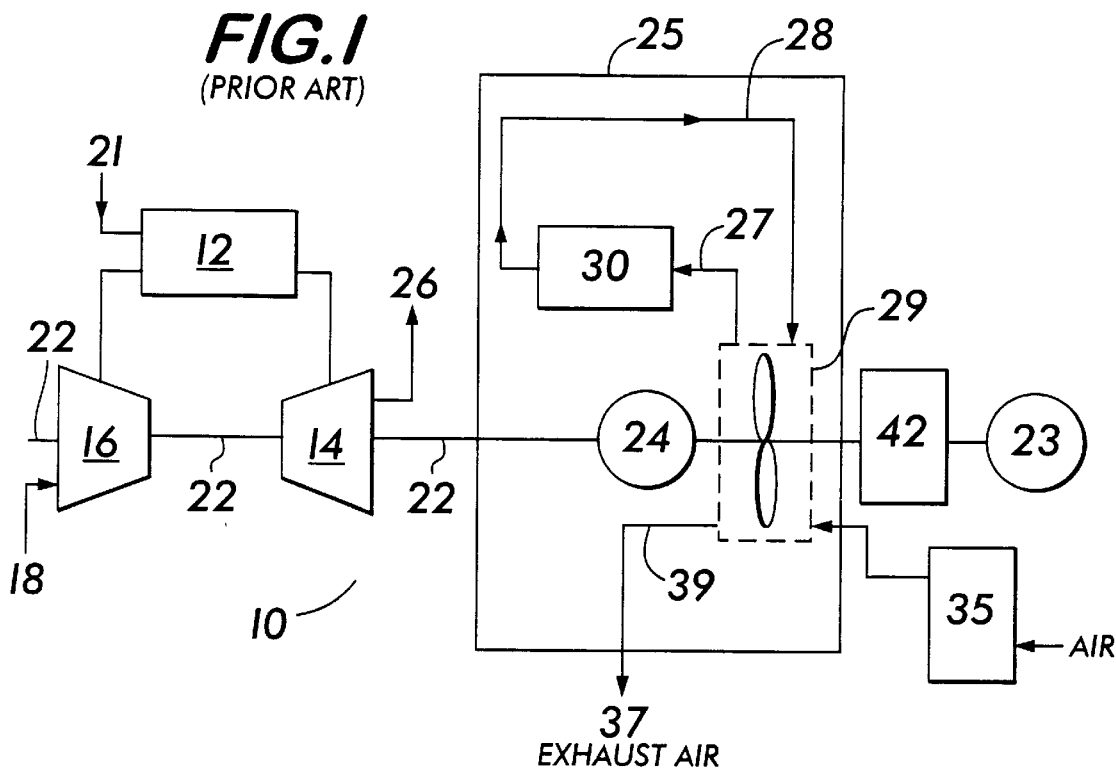
FIG. 1 is a schematic diagram of a prior art combustion turbine system.

FIG. 1 is a schematic diagram of a prior art combustion turbine system 10 that generally includes a combustor 12, a turbine section 14 and a compressor 16. Air enters the inlet of the compressor at 18 and is compressed as it travels through the compressor 16. After traveling through the compressor 16, the air 20 enters the combustor 12 where fuel 21, such as natural gas, is burned to produce a hot gas. The hot gas exits the combustor 12 and travels through the turbine section 14. In the turbine section 14 the hot gas expands, and the energy of the hot gas is converted into work to drive the rotor shaft 22. More specifically, as the rotor shaft 22 turns it may drive the compressor 16 and another load 24. This load 24 is typically an electrical generator. The hot gas 26 is then exhausted from the turbine section 14.

During normal operation of the combustion turbine system 10, the compressor 16 is powered by the turbine section 14 of the combustion turbine system 10. More particularly, the compressor 16 and the turbine section 14 are mounted on the same rotor shaft 22, so that when the hot gas flows through the turbine section 14 and causes the rotor 22 to rotate, the rotor 22 rotates and powers the compressor 16 to produce compressed air. However, when the combustion turbine system 10 is being started, the combustor 12 cannot produce a sufficient amount of hot gas to rotate the rotor 22. Therefore, when the combustion turbine system 10 is being started, a separate prime mover 23 is needed to rotate the rotor 22 until the combustor 12 produces enough hot gas to drive the rotor 22 and thereby power the compressor 16. After the combustion turbine has been started the prime mover 23 is no longer needed and it generally is not used. Typically, this prime mover 23 that powers the compressor 16 upon combustion turbine start up is an electrical motor whose ratings vary with the size of the compressor 16 that is drives. A clutch 42 or torque converter 42 may be used to selectively connect the prime mover 23 to the rotor 22. After the rotor obtains a requisite critical speed upon starting the turbine, the clutch or torque converter 42 will disconnect the prime mover 23 from the rotor 22.

As mentioned above, the electrical generator 24 is driven by the turbine section 14 to produce electricity. The electrical generator 24 may be disposed within a generator enclosure 25. As shown, a closed loop cooling circuit 28 for cooling the generator 24 may be disposed in the generator enclosure 25. The cooling circuit 28 may include a blower 29 and a heat exchanger 30. The blower 29 provides the impetus for the cooling medium to flow through the cooling circuit 28. Although the cooling medium may comprise other gases, the cooling medium is preferably air or hydrogen gas. The cooling medium flows through the electrical generator enclosure 25 and absorbs heat (at point 27) produced by the electrical generator 24 and thereby prevents the electrical generator 24 from over heating. In the heat exchanger 30, the cooling medium may be cooled and then recirculated by the blower 29 through the cooling circuit 28.

Conventionally, the blower 29 is a "shaft mounted blower" that is mounted on the end of the shaft extending from the electrical generator 24, as shown in FIG. 1. This shaft is preferably coupled to the rotor 22, so that rotation of the rotor 22 will cause rotation of the shaft and thereby power the blower 29. In this prior art system, the turbine powers the blower 29.

Rather than using a heat exchanger 30 as shown in FIG. 1, the blower 29 may pull ambient air through a filter 35 and direct this air to the electrical generator 24. As the air or cooling medium travels through the generator enclosure 25, the cooling medium will absorb (at point 39) heat produced by the generator 24 and cool the generator 24. After traveling through the generator 24, the heated coolant may be exhausted to atmosphere 37. This type of cooling system may be referred to as an "open" system. Typically, a generator 24 will have either a closed system described above or an open system and this invention may be employed with either system.

Figure 2:
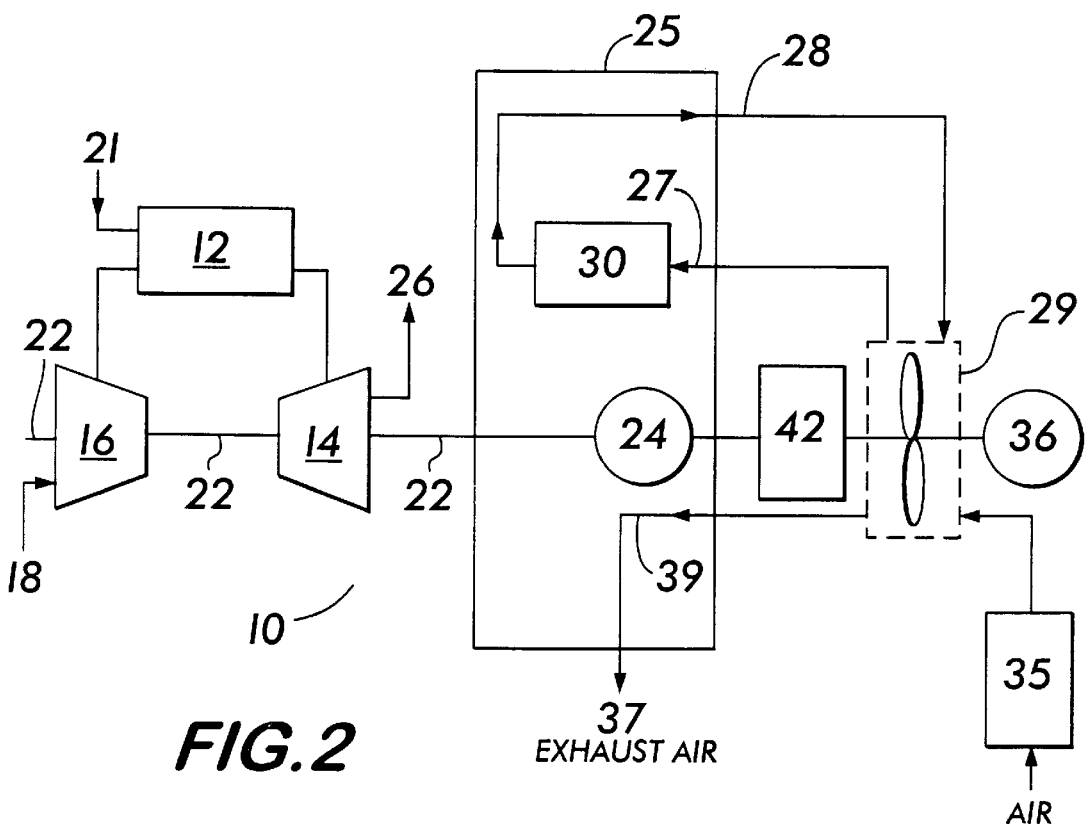
FIG. 2 is a schematic diagram of a preferred embodiment of the combustion turbine system of this invention.

As described above, in prior art combustion turbine systems, the prime mover 23 that powers the compressor 16 upon combustion turbine start up is not used after the combustion turbine has been started and the blower 29 is powered from the shaft 34 of the electrical generator. FIG. 2 is a schematic depiction of a preferred embodiment of a combustion turbine system 10 of this invention. Similar to the prior art combustion turbine system, the combustion turbine system of this invention may have a compressor 16, a combustor 12, a turbine section 14, a rotor shaft 22, an electrical generator 24 and a cooling circuit 28 for the electrical generator 24. The cooling circuit 28 may also include a blower 29 and a heat exchanger 30. Rather than a closed cooling system, the generator may have an open cooling system. However, the combustion turbine system 10 of this invention uses a prime mover 36 to power the blower 29 that is external to the turbine.

In a preferred embodiment of this invention, the prime mover 36 is an electrical motor that can provide about 2,000 to 10,000 horse power. This type of motor may be used with either the 501 or 701 series combustion turbines manufactured by CBS Corporation.

Disposed between the generator 24 and the prime mover 36 is a means 42 for selectively coupling the prime mover 36 to the rotor 22. In a preferred embodiment of this invention, the means 42 for selectively coupling the prime mover 36 to the rotor 22 is a torque convertor or clutch. This clutch or torque converter preferably forms a portion of the rotor 22 that extends from the compressor 16. Although any suitable clutch or torque converter may be used, an EL Series Torque Converter identified and manufactured by Voith may be employed in a preferred embodiment of this invention. The clutch or torque converter may be operated in a conventional manner to couple and decouple the prime mover 36 to and from the compressor 16.

It is preferable that the prime mover 36 be coupled to the rotor 22, so that it can be selectively connected and disconnected from the rotor 22. As shown in FIG. 2, the prime mover 36 is also preferably coupled to the blower 29, so that it can power the blower 29. By coupling the prime mover 36 to the blower and selectively coupling the prime mover 36 to the rotor 22, the prime mover 36 may be used to power the blower 29 and the rotor 22. As described above, power to turn the rotor 22 is needed upon starting the combustion turbine because when the combustion turbine is started, it does not produce enough hot gas to drive the rotor 22. After the combustion turbine has produced a sufficient amount of hot gas, the prime mover 36 can be decoupled from the rotor 22 by the means 42, so that the rotor 22, is no longer driven by the prime mover 36.

As alluded to above, the blower 29 may be employed to cool the generator 24 by providing coolant through the ducts. When powered by the prime mover 36, the blower 29 provides the cooling medium for the cooling circuit that cools the electrical generator 24.

In this invention, the prime mover 36 that powers the blower 29 is external to the generator 24. This provides several advantages. Among these potential advantages are reducing the overall cost of a combustion turbine system. Furthermore, the capital and maintenance costs associated with the hardware that is needed for mounting a blower to the shaft of the electrical generator may be eliminated. Moreover, in prior art combustion turbine systems the prime mover used to turn the rotor upon turbine startup was typically not used after starting the turbine. However, in this invention, the prime mover that is used to turn the rotor is also used to power the blower during operation of the combustion turbine. Therefore, this invention eliminates the inefficiency associated with having a prime mover whose sole purpose is to turn the rotor upon startup. In addition, the overall efficiency of the combustion turbine system may be enhanced with this invention because commercially available shaft mounted blowers for electrical generators are typically less efficient due primarily to blower windage losses, than the prime mover 36 and the blower 29 used in this invention.

In summary, the combustion turbine system of this invention has a prime mover 36 that can power an external blower 29 and that may be selectively coupled to turn a turbine rotor 22. When the prime mover 36 is selectively coupled to the rotor 22, it can provide power to turn the rotor 22 which is typically needed upon starting the combustion turbine. After the combustion turbine has been started and produces enough hot gas to drive the rotor 22 and thereby power the compressor 16, the prime mover 36 can be selectively decoupled from the rotor 22. In a preferred embodiment of this invention, the prime mover 36 can be selectively coupled and decoupled to and from the compressor 16 by a clutch or torque converter 42 that forms a portion of the rotor 22. While coupled or decoupled from the turbine rotor 22, the prime mover 36 can power the external blower.

The external blower of this invention can also be used with a steam turbine system, as opposed to a gas turbine system described above As is conventional, a steam turbine system may have a condenser, a turbines a steam generator and an electrical generator The electrical generator may be coupled to the steam turbine so that the steam turbine is the prime mover for the electrical generator. Similar to the electrical generator used in a gas turbine system, the electrical generator of the steam turbine system also requires cooling. According to this invention, an external blower that is external to the electrical generator may be used to supply a cooling medium to the generator. The blower is external in that it is not contained within the generator enclosure that encases the electrical generator.

Similar to the electrical generator of the gas turbine system, the electrical generator of the steam turbine system may have either an open or a closed loop cooling system. The external blower of this invention can be mounted on the rotor shaft that connects the steam turbine to the electrical generator. If the electrical generator is mounted on the rotor shaft, the electrical generator is separated from the external blower by either a clutch or a torque converter Alternatively, the external blower is not mounted on the rotor shaft and is separated from the electrical generator.

If a closed loop system is employed a heat exchanger may be disposed within the generator enclosure for cooling the cooling medium that absorbs heat produced by the generator. The cooling medium may be air or another suitable gas After absorbing heat from the generator and being cooled, the cooling medium is then recirculated through the generator enclosure by the external blower in a closed loop type of system. If an open loop cooling system is used, the air is exhausted from the generator enclosure after it travels through the enclosure and is not recirculated by the external blower. Rather, the external blower continuously provides additional cooling medium to the generator.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A combustion turbine system, comprising:

a compressor for producing a compressed air;

an electrical generator for producing an electrical current;

a turbine section having a rotor for driving the compressor and the electrical generator;

a combustor for burning a mixture of the compressed air produced by the compressor and fuel;

a blower for providing air to cool the electrical generator that is external to the electrical generator;

a prime mover for powering the blower and the compressor; and a disconnect positioned between the prime mover and the compressor and operable to selectively disconnect the prime mover from driving the compressor while remaining operatively connected to drive the blower.

2. The combustion turbine system of claim 1, wherein the disconnect comprises a torque converter.

3. The combustion turbine system of claim 1, wherein the disconnect comprises a clutch.

4. The combustion turbine system of claim 1, wherein the electrical generator comprises a heat exchanger for cooling the electrical generator.

5. The combustion turbine system of claim 4, wherein the blower provides cooling air for the heat exchanger of the electrical generator.

6. The combustion turbine system of claim 4, further comprising a duct for placing the blower in flow communication with the heat exchanger.

7. The combustion turbine system of claim 1, wherein the disconnect further comprises a means for selectively connecting the prime mover to the rotor, so that the prime mover can power the rotor when the combustion turbine is started and so that the prime mover can be decoupled from the rotor after the combustion turbine has been started.

8. A method of operating a combustion turbine system, comprising:
   starting a prime mover for powering a blower for producing a cooling medium for an electrical generator that is external to the electrical generator;
   coupling the prime mover to a rotor to turn the rotor combustion turbine system; and
   decoupling the prime mover from the rotor after a combustor produces enough energy to turn the rotor, without decoupling the prime mover from powering the blower.

9. The method of claim 8, wherein the step of coupling comprises operating a clutch for coupling and decoupling the prime mover to the rotor.

10. The method of claim 9, wherein the step of operating the clutch comprises coupling the prime mover to the rotor of the combustion turbine that runs through the compressor.

11. The method of claim 8, wherein the step of decoupling comprises operating a clutch for coupling and decoupling the prime mover from the compressor.

12. The method of claim 8, further comprising the step of producing a hot gas in the combustor for driving the rotor disposed in a turbine section of the combustion turbine system.

13. The method of claim 8, further comprising the step of cooling an electrical generator with the cooling medium produced by the blower.

14. A combustion turbine system, comprising:
   a compressor for producing a compressed air;
   an electrical generator for producing an electrical current;
   a turbine section having a rotor for driving the compressor and the electrical generator;
   a combustor for burning a mixture of the compressed air produced by the compressor and fuel;
   a blower for providing air to cool the electrical generator that is external to the electrical generator;
   a prime mover for powering the blower and selectively powering the rotor; and
   a means for (i) coupling the prime mover to the rotor so that the prime mover can selectively power the rotor and (ii) selectively decoupling the rotor from the prime mover without decoupling the prime mover from powering the blower.

15. The combustion turbine system of claim 14, wherein the means for coupling is a torque converter.

16. The combustion turbine system of claim 14, wherein the electrical generator comprises a heat exchanger for cooling the electrical generator.

17. The combustion turbine system of claim 16, wherein the blower provides cooling air for the heat exchanger of the electrical generator.

18. The combustion turbine system of claim 16, further comprising a duct for placing the blower in flow communication with the heat exchanger.

19. The combustion turbine system of claim 14, further comprising a cooling circuit for cooling the electrical generator and wherein the blower is disposed in the cooling circuit.

* * * * *